United States Patent
Jing et al.

(10) Patent No.: US 8,354,173 B2
(45) Date of Patent: Jan. 15, 2013

(54) POWDER COATING FLUOROPOLYMER COMPOSITIONS CONTAINING MONO-HYDROXY AROMATIC MATERIALS

(75) Inventors: Naiyong Jing, Woodbury, MN (US); Blake E. Chandler, Woodbury, MN (US); Gregg D. Dahlke, St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 747 days.

(21) Appl. No.: 12/444,872

(22) PCT Filed: Oct. 12, 2007

(86) PCT No.: PCT/US2007/081215
§ 371 (c)(1),
(2), (4) Date: Apr. 9, 2009

(87) PCT Pub. No.: WO2008/048884
PCT Pub. Date: Apr. 24, 2008

(65) Prior Publication Data
US 2010/0009197 A1    Jan. 14, 2010

Related U.S. Application Data

(60) Provisional application No. 60/829,322, filed on Oct. 13, 2006.

(51) Int. Cl.
*B32B 15/08* (2006.01)
*B32B 15/082* (2006.01)
*B32B 15/18* (2006.01)
*B32B 15/20* (2006.01)
*B32B 27/30* (2006.01)

(52) U.S. Cl. ........ 428/463; 428/421; 428/422; 428/461; 524/326.2; 524/323; 524/368; 524/369; 524/372; 524/383; 524/384; 524/544; 524/326; 524/330; 524/334; 524/349; 524/351; 523/212; 523/242

(58) Field of Classification Search ........................ None
See application file for complete search history.

(56) References Cited

U.S. PATENT DOCUMENTS

| | | | | |
|---|---|---|---|---|
| 2,631,098 A | * | 3/1953 | Redfern | 162/165 |
| 2,801,990 A | * | 8/1957 | Mastin et al. | 525/440.05 |
| 2,988,536 A | * | 6/1961 | Hine et al. | 528/140 |
| 3,655,727 A | | 4/1972 | Patel et al. | |
| 3,904,623 A | * | 9/1975 | Shay et al. | 544/196 |
| 3,920,595 A | * | 11/1975 | Anderson et al. | 523/400 |
| 4,189,421 A | * | 2/1980 | Shay et al. | 524/509 |
| 4,217,377 A | * | 8/1980 | Shay et al. | 427/195 |
| 4,770,939 A | * | 9/1988 | Sietses et al. | 428/402 |
| 4,865,915 A | * | 9/1989 | Okonogi et al. | 428/336 |
| 5,154,968 A | * | 10/1992 | DePetris et al. | 428/300.1 |
| 5,213,896 A | * | 5/1993 | Schlipf et al. | 428/407 |
| 5,223,562 A | * | 6/1993 | Sagawa et al. | 524/275 |
| 5,356,971 A | * | 10/1994 | Sagawa et al. | 524/275 |
| 5,460,661 A | * | 10/1995 | Maynard, Jr. | 148/251 |
| 5,576,389 A | * | 11/1996 | Ueno et al. | 525/119 |
| 5,756,588 A | | 5/1998 | Kolb et al. | |
| 6,576,718 B1 | * | 6/2003 | Yeager et al. | 525/523 |
| 6,911,512 B2 | * | 6/2005 | Jing et al. | 526/242 |
| 7,144,948 B2 | * | 12/2006 | Yamauchi et al. | 524/576 |
| 7,153,907 B2 | * | 12/2006 | Asakawa et al. | 525/123 |
| 7,176,250 B2 | * | 2/2007 | Asakawa et al. | 523/340 |
| 7,183,356 B2 | * | 2/2007 | Ishida | 525/199 |
| 7,414,084 B2 | * | 8/2008 | Yamaguchi et al. | 523/201 |
| 2005/0080210 A1 | * | 4/2005 | Jing et al. | 526/242 |
| 2005/0277740 A1 | | 12/2005 | Paglia et al. | |
| 2010/0040897 A1 | * | 2/2010 | Jing et al. | 428/457 |

FOREIGN PATENT DOCUMENTS

| | | |
|---|---|---|
| EP | 0 339 126 A1 | 11/1989 |
| JP | 49-016740 A | 2/1974 |
| WO | WO 01/27195 A1 | 4/2001 |
| WO | WO 2005/040260 A1 | 5/2005 |
| WO | WO 2006/071421 A2 | 7/2006 |

OTHER PUBLICATIONS

Perspectives on Structure and Mechanism in Organic Chemistry, Carroll, Brooks/Cole, Pacific Grove (1998) (pp. 366-386).
March's Advanced Organic Chemistry: Reactions, Mechanism and Structure, 5th ed., Smith and March, John Wiley & Sons, (2001) (Chapters 11 and 13).
Modern Fluoropolymers: High Performance Polymers for Diverse Applications, edited by John Scheirs, Wiley Series in Polymer Science 1997, pp. 2-9.

* cited by examiner

*Primary Examiner* — Vivian Chen
(74) *Attorney, Agent, or Firm* — C. Michael Geise

(57) ABSTRACT

Provided are compositions comprising a) a fluoroplastic; b) an aromatic material having exactly one hydroxyl group, wherein the aromatic material is free of thiol groups, and wherein the hydroxyl group is bonded to an aromatic carbon; c) a salt former compound capable of forming a salt with the aromatic material; and d) optionally a phase transfer catalyst. Also provided are reaction products of the described compositions, multi-layer articles comprising the compositions and reaction products, and methods for making the compositions, reaction products, and articles.

9 Claims, No Drawings

POWDER COATING FLUOROPOLYMER COMPOSITIONS CONTAINING MONO-HYDROXY AROMATIC MATERIALS

CROSS REFERENCE TO RELATED APPLICATIONS

This application is a national stage filing under 35 U.S.C. 371 of PCT/US2007/081215, filed Oct. 12, 2007, which claims priority to U.S. Provisional Application No. 60/829,322, filed Oct. 13, 2006, the disclosure of which is incorporated by reference in its/their entirety herein.

SUMMARY

The present invention relates to a powder coating fluoropolymer composition comprising (a) a fluoroplastic, (b) a mono-hydroxy aromatic material wherein the aromatic material is free of thiol groups, and wherein the hydroxyl group is bonded to an aromatic carbon, (c) a salt former compound capable of forming a salt with the aromatic material; and optionally (d) a phase transfer catalyst.

In another aspect, the invention relates to an article comprising a coating, the coating comprising (a) a fluoroplastic, (b) a mono-hydroxy aromatic material wherein the aromatic material is free of thiol groups, and wherein the hydroxyl group is bonded to an aromatic carbon, (c) a salt former compound capable of forming a salt with the aromatic material; and optionally (d) a phase transfer catalyst.

In yet another aspect, the invention relates to a reaction product of (a) a fluoroplastic, (b) a mono-hydroxy aromatic material wherein the aromatic material is free of thiol groups, (c) a salt former compound capable of forming a salt with the aromatic material; and optionally (d) a phase transfer catalyst.

In another aspect, the present invention relates to a multilayer article comprising a substrate and a first layer comprising a reaction product of (a) a fluoroplastic, (b) a mono-hydroxy aromatic material wherein the aromatic material is free of thiol groups, and wherein the hydroxyl group is bonded to an aromatic carbon, (c) a salt former compound capable of forming a salt with the aromatic material; and optionally (d) a phase transfer catalyst. Each of the aromatic material and the salt former compound is present at the interface between the substrate and the remainder of the first layer, blended with the fluoroplastic, or both. The first layer is bonded to the substrate.

In another aspect, the invention provides a method of providing a fluoropolymer coating composition comprising providing a composition comprising (a) a fluoroplastic, (b) a mono-hydroxy aromatic material wherein the aromatic material is free of thiol groups, and wherein the hydroxyl group is bonded to an aromatic carbon, (c) a salt former compound capable of forming a salt with the aromatic material; and optionally (d) a phase transfer catalyst. The fluoroplastic is provided in granular or powder form. The method further comprises heating the composition to a temperature above the melting point of the aromatic material and mixing the composition.

In a further aspect, the present invention relates to providing a fluoropolymer-coated surface. The method comprises providing a substrate and applying to the substrate a composition comprising (a) a fluoroplastic, (b) a mono-hydroxy aromatic material wherein the aromatic material is free of thiol groups, and wherein the hydroxyl group is bonded to an aromatic carbon, (c) a salt former compound capable of forming a salt with the aromatic material; and optionally (d) a phase transfer catalyst. The method further comprises bonding the composition to the substrate.

In a further aspect, the present invention relates to a powder coating fluoropolymer composition comprising a) a fluoroplastic; b) an aromatic material having exactly one deprotonated hydroxyl group, wherein the aromatic material is free of thiol groups, and wherein the deprotonated hydroxyl group is bonded to an aromatic carbon; and c) optionally a phase transfer catalyst.

It is an advantage of the present invention in one aspect to provide compositions for bonding fluoropolymers to substrates such as metals. Other features and advantages of the invention may be apparent from the following detailed description and the claims.

DETAILED DESCRIPTION

The present invention provides, in one aspect, a composition comprising (a) a fluoroplastic, (b) a mono-hydroxy aromatic material wherein the aromatic material is free of thiol groups, and wherein the hydroxyl group is bonded to an aromatic carbon, (c) a salt former compound capable of forming a salt with the aromatic material; and optionally (d) a phase transfer catalyst.

Mono-hydroxy aromatic materials useful in the present invention have at least one aromatic ring and the aromatic material is free of thiol groups. The hydroxyl group of the mono-hydroxy aromatic material is bonded to an aromatic carbon atom. In some embodiments, the aromatic material comprises a mono-cyclic aromatic group such as phenol or a substituted phenol. In other embodiments, the aromatic material comprises a poly-cyclic aromatic group such as naphthol or a substituted naphthol. In some embodiments, the hydroxyl group of the mono-hydroxy aromatic material is not directly attached to the aromatic material. In some embodiments, the aromatic material is selected from benzyl alcohol, fluorene alcohol, and derivatives thereof.

Particular examples of mono-hydroxy aromatic materials include pentafluorophenol, nitrophenol, fluorophenol, naphthol, methoxynaphthol, fluorenol, and combinations thereof. It is understood that the aromatic groups contemplated by the present application may be substituted by any groups known to organic chemistry, including, for instance, a hydrogen atom, an alkyl group (e.g., having from 1 to 10 carbon atoms), an alkylene group (e.g., having from 1 to 10 carbon atoms), an aryl group (e.g., having from 5 to 20 carbon atoms), an alkaryl group (e.g., having from 6 to 25 carbon atoms), a nitro group, a cyano group, an acyl group, an Ar—S(O)— group wherein Ar is an aromatic group, an Ar—S(O)$_2$— group wherein Ar is an aromatic group, an Ar$_2$—P(O)— group wherein Ar is an aromatic group, a halogen atom, and combinations thereof.

In some particular embodiments, the aromatic material has a structure of the general formula:

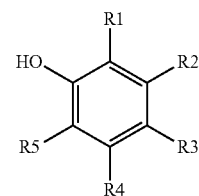

wherein R1, R2, R3, R4, and R5 are each independently selected from a hydrogen atom, an alkyl group having 1 to 10 carbon atoms, an alkylene group having 1 to 10 carbon atoms wherein the alkylene group forms an alkylene fused ring with a group in the ortho position, an alkenylene group having 1 to 10 carbon atoms wherein the alkenylene group forms an alkenylene fused ring with a group in the ortho position, an aryl group having 5 to 20 carbon atoms, an alkaryl group having 6 to 25 carbon atoms, a nitro group, a cyano group, an acyl group, an Ar—S(O)— group wherein Ar is an aromatic group, an Ar—S(O)$_2$— group wherein Ar is an aromatic group, an Ar$_2$P(O)— group wherein Ar is an aromatic group, and a halogen atom. In particular embodiments, at least one of R1 to R5 is an aryl group or an alkaryl group. It is understood throughout the present description that the alkyl, alkaryl, alkylene, and alkenylene groups described as aromatic substituents may be non-fluorinated, partially fluorinated, or perfluorinated. Further, the alkyl, alkaryl, alkylene, and alkenylene groups described as aromatic substituents may be linear or branched.

In certain embodiments, it may be desirable to either increase or decrease the acidity of the hydroxyl group attached to the aromatic ring. One having ordinary skill in the art recognizes the possibility of increasing the acidity of the hydroxyl group by adding electron-withdrawing substituents to the aromatic ring, as well as the ability to decrease the acidity of the hydroxyl group by adding electron-donating substituents to the aromatic ring. Such effects are described, for instance, in Perspectives on Structure and Mechanism in Organic Chemistry, Carroll, Brooks/Cole, Pacific Grove (1998) (particularly pages 366-86, discussing substituent effects and linear free energy relationships). In yet further embodiments, the aromatic material may have a pKa for the hydroxyl group of 6 or less.

Examples of aromatic materials wherein at least one of R1 to R5 is selected from an alkylene group having 1 to 10 carbon atoms wherein the alkylene group forms an alkylene fused ring with a group in the ortho position include:

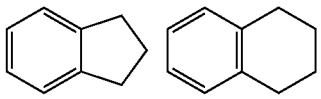

Examples of aromatic materials wherein at least one of R1 to R5 is selected from an alkenylene group having 1 to 10 carbon atoms wherein the alkenylene group forms an alkenylene fused ring with a group in the ortho position include:

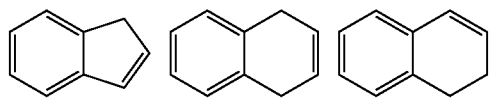

In some embodiments, the alkenylene-fused ring is an aromatic ring, such as when the alkenylene-fused ring forms a naphthyl ring:

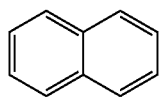

Indeed, particular embodiments of the aromatic compound include mono-hydroxy naphthalene and substituted mono-hydroxy naphthalene.

The preparation of aromatic materials as described herein may be achieved by methods familiar to those of ordinary skill in the art. These methods include, for instance, those described in Organic Synthesis, 2nd ed., Fuhrhop and Penzlin, VCH, Weinheim (1994); Some Modern Methods of Organic Synthesis, 3rd ed., Carruthers, University Press, Cambridge (1993); and March's Advanced Organic Chemistry: Reactions, Mechanism and Structure, 5th ed., Smith and March, John Wiley & Sons, (2001) (particularly chapters 11 and 13).

In some embodiments, the present invention demonstrates that compositions comprising (a) a fluoroplastic, (b) a monohydroxy aromatic material wherein the aromatic material is free of thiol groups, and wherein the hydroxyl group is bonded to an aromatic carbon, (c) a salt former compound capable of forming a salt with the aromatic material; and optionally (d) a phase transfer catalyst may give excellent adhesion to a substrate, in particular, to metal substrates. In yet further embodiments, a boiling water test was used to show that the interlayer adhesion remained strong after exposure of several hours, e.g., after 24 hours. Surprisingly, monohydroxy aromatic material wherein the aromatic material is free of thiol groups, and wherein the hydroxyl group is bonded to an aromatic carbon have aided with the adherence of fluoropolymers, and in particular perfluoropolymers, to metal surfaces.

Fluoropolymers included in the present description include fluoroplastics, such as partially and perfluorinated fluoroplastics. Fluoroplastics include, for instance, those having interpolymerized units of one or more fluorinated or perfluorinated monomers such as tetrafluoroethylene (TFE), chlorotrifluoroethylene (CTFE), hexafluoropropylene (HFP), vinylidene fluoride (VDF), fluorovinyl ethers, perfluorovinyl ethers, as well as combinations of one or more of these. Fluoroplastics may further include copolymers comprising one or more of the fluorinated or perfluorinated monomers in combination with one or more non-fluorinated comonomer such as ethylene, propylene, and other lower olefins (e.g., C2-C9 containing alpha-olefins).

In other embodiments, polytetrafluoroethylene (PTFE) can be the fluoroplastic according to the present description. When PTFE is used, it may be used as a blend with another fluoropolymer and may also contain a fluoropolymer filler (in the blend or in the PTFE only).

Useful fluoroplastics also include those commercially available under the designations THV (a copolymer of tetrafluoroethylene, hexafluoropropylene, and vinylidene fluoride), FEP (a copolymer of tetrafluoroethylene and hexafluoropropylene), PFA (a copolymer of tetrafluoroethylene and perfluorovinyl ether), HTE (a copolymer of tetrafluoroethylene, hexafluoropropylene, and ethylene), ETFE (a copolymer of tetrafluoroethylene and ethylene), ECTFE (a copolymer of chlorotrifluoroethylene and ethylene), PVF (polyvinyl fluoride), PVDF (polyvinylidene fluoride), as well as combinations and blends of one or more of these fluoroplastics.

Any of the aforementioned fluoropolymers may further contain interpolymerized units of additional monomers, e.g., copolymers of TFE, HFP, VDF, ethylene, or a perfluorovinyl ether such as perfluoro(alkyl vinyl)ether (PAVE) and/or a perfluoro(alkoxy vinyl)ether (PAOVE). Combinations of two or more fluoroplastics may also be used. In some embodiments, the fluoroplastic is THV, ETFE, HTE, or a combination thereof.

In addition to a fluoroplastic and an aromatic material as described above, the description also provides a salt former compound. Salt former compounds include organic and inorganic compounds capable of forming a salt with the aromatic material. More specifically, useful salt former compounds include oxides and/or hydroxides of magnesium, calcium, and other materials, as well as amines. In one aspect of the present invention, the salt former compound has a pKb sufficiently low to be capable of forming a phenolate salt with the aromatic material. In some embodiments, the salt former compound has a pKb below about 8, below about 6, below about 4, below about 2, around 0, or even below 0.6.

In some embodiments, it may be advantageous to first react a salt former compound with an aromatic material as described herein to form an aromatic material having a deprotonated hydroxyl group. The deprotonated hydroxyl group may then be mixed with a fluoroplastic as described herein and optionally a phase transfer catalyst. Accordingly, this invention also relates to a powder coating fluoropolymer composition comprising a) a fluoroplastic; b) an aromatic material having exactly one deprotonated hydroxyl group, wherein the aromatic material is free of thiol groups, and wherein the deprotonated hydroxyl group is bonded to an aromatic carbon; and c) optionally a phase transfer catalyst.

The aromatic material and/or salt former compounds described are generally present in small amounts relative to the weight of the fluoroplastic. For example, the amount of aromatic material and/or salt former compound (combined or individually) is generally below about 60 weight percent (wt %), below about 50 wt %, below about 35 wt %, below about 20 wt %, or even below 15 wt % of the overall composition (the aromatic material, salt former, phase transfer catalyst, if any, and fluoropolymer, but not including the substrate when used). In another aspect, the aromatic material and/or salt former (combined or individually) are generally above about 0.1 wt %, above 0.5 wt %, or even above 1 wt % of the overall composition.

In some embodiments, a phase transfer catalyst (PTC) may be used in the compositions described herein. Such materials are known in the art and include, for instance, triphenylbenzylphosphonium salts, tributylalkylphosphonium salts, tetraphenylphosphonium salts, tetrabutylphosphonium salts, tributylbenzylammonium salts, tetrabutylammonium salts, tetrapropylammonium salts, tetrakis(2-hydroxyethyl)ammonium salts, tetramethylammonium salts, tetraalkylarsonium salts, tetraarylarsonium salts, and triarylsulfonium salts. Also contemplated are multi-valent onium salts. That is, salts that are multi-valent cations having two or more sites of positive charge. The salts described include, for instance, halide salts such as bromide, chloride, and iodide salts. Also contemplated herein are crown-ether containing phase transfer catalysts.

The PTC may be used in amounts below about 20 wt %, below about 15 wt %, below about 10 wt %, below about 5 wt %, or even below about 2 wt %, based on the total weight of the salt former compound, the aromatic material, PTC, and the fluoropolymer (but not including the weight of the substrate when used). In another aspect, the PTC may be used in amounts above 0.1 wt %, above 0.3 wt %, or even above 0.5 wt % based on the total weight of the salt former compound, the aromatic material, PTC, and the fluoropolymer. In some embodiments, it has been found that adjusting the amount of phase transfer catalyst can reduce the amount of bubbling observed in coatings as described herein. That is, some of the coatings described herein, when heated with a substrate, form bubbles. By adjusting the amount of phase transfer catalyst, the amount of bubbling can be reduced. For instance, in some embodiments, increasing the amount of phase transfer catalyst may reduce the amount of bubbling observed.

The compositions described herein may also include additives incorporated therein. Additives include, but are not limited to, inert fillers, anti-oxidants, stabilizers, pigments, reinforcing agents, lubricants, flow additives, other polymers, and the like. Yet further additives include metals and metal oxides such as, for instance, chromium oxide, chromium, zinc oxide, copper oxide, copper, nickel, titanium, stainless steel, aluminum, titanium dioxide, tin oxide, iron, iron oxide, and the like. Such metals may serve, for instance, as abrasion-resistant fillers or as compatibilizers. Also included herein are polymeric additives such as polyphenylene sulfide resin, epoxy resins, polyether sulfones, polyamide imide, polyetherether ketones, and combinations thereof. Other abrasion-resistant fillers include, for example, ceramics, high temperature and/or abrasion-resistant polymers, and the like. Further additives include those capable of imparting desirable coating properties such as increased hardness, abrasion resistance, electrical and thermal conductivity, and color. Exemplary inert fillers include mica, boron nitride, clays, graphite, calcium carbonate, carbon, silicates, glass, fibers, and the like. Flow additives are, generally, materials known to improve wetting and flow of polymer compositions (including low molecular weight materials, oligomers, polymers, and combinations thereof). Flow additives may, for instance, be selected from low viscosity materials and materials that are not compatible with the fluoropolymer (e.g., hydrocarbon polymers such as polyacrylates). In some embodiments, the compositions are substantially free of polymers other than the fluoroplastic or combination of fluoroplastics described above. That is, the compositions may include less than 25 wt % of a polymer additive, less than 10 wt %, less than 5% of a polymer additive, or even no polymer additive.

In another aspect, the present description provides a composition comprising a reaction product of a) a fluoroplastic, b) an aromatic material having exactly one hydroxyl group, wherein the aromatic material is free of thiol groups, c) a salt former compound capable of forming a salt with the aromatic material, and optionally d) a phase transfer catalyst. In yet a further aspect, the present description provides an article comprising a coating, the coating comprising a composition a reaction product of a) a fluoroplastic, b) an aromatic material having exactly one hydroxyl group, wherein the aromatic material is free of thiol groups, c) a salt former compound capable of forming a salt with the aromatic material, and optionally d) a phase transfer catalyst.

In other aspects, the present description provides multilayer articles that comprise a coating. In some embodiments, the coating comprises a) a fluoroplastic, b) an aromatic material having exactly one hydroxyl group, wherein the aromatic material is free of thiol groups, c) a salt former compound capable of forming a salt with the aromatic material, and optionally d) a phase transfer catalyst. In other embodiments, the coating comprises a reaction product of a) a fluoroplastic, b) an aromatic material having exactly one hydroxyl group, wherein the aromatic material is free of thiol groups, c) a salt former compound capable of forming a salt with the aromatic material, and optionally d) a phase transfer catalyst.

In yet further embodiments, the multi-layer articles comprise a substrate comprising a substantially organic material or a substantially inorganic material. The substantially organic material may optionally be essentially free of a phenolate or thiolate salt. The layered article may further have a first layer comprising a reaction product of a) a fluoroplastic, b) an aromatic material having exactly one hydroxyl group, wherein the aromatic material is free of thiol groups, c) a salt former compound capable of forming a salt with the aromatic material, and optionally d) a phase transfer catalyst. In such layered articles, each of (i) the aromatic material and (ii) the salt former compound is, independently, present at the interface between the substrate and the remainder of the first layer, blended with the fluoroplastic, or both. In some embodiments, the first layer is bonded to the substrate. In further embodiments, the layer or layers of the multi-layer articles that comprise(s) a fluoroplastic is substantially free of fluoroelastomer. That is, the layer(s) that comprise(s) the fluoroplastic contain(s) less than about 10% by weight of fluoroelastomer, less than 5% by weight, less than 1% by weight, less than 0.5% by weight, or even no fluoroelastomer.

Substantially inorganic substrates can be, for example, glass, ceramic, metal, iron, stainless steel, steel, aluminum, copper, nickel, and alloys and combinations thereof. In certain embodiments, the substrate is selected from metal substrates. Other suitable substrates include thermally stable organic substrates, including fluoropolymers, nylon, polyimide, and the like.

The substrate shape is not particularly limited. For example, the substrate can be the surface of a fiber, a flake, a particle, or combinations thereof. Specific examples include metallic sheeting in the form of ductwork such as is useful in exhaust ducts for chemical or semiconductor operations.

In some embodiments, multi-layer articles may further comprise a second layer adjacent to the first layer. The second layer may comprise a fluoropolymer. Further, a third layer may optionally be present, which may also comprise a fluoropolymer. The optional second and third layers may further comprise a mixture of two or more fluoropolymers.

In some embodiments, the multi-layer articles provide bonding, as measured by peel strength testing, described below, between the substrate and the fluoroplastic. For example, at 22-25° C., after baking the samples, the compositions described herein bond to various substrates. In some embodiments, the layered articles maintain desirable peel strengths after various exposure conditions of increasing severity and duration to boiling water. For example, in several embodiments, the layered articles provide high or very high peel strength even after boiling water exposure for 1 hour, for 5 hours, for 15 hours, or even for 24 hours. The multi-layered articles may exhibit peel strengths, optionally after boiling water exposure, of at least 00.7, at least 0.9, at least 1.8, at least 2.6, at least 3.5, or even at least 4.3 N/mm.

In another aspect, the present description provides a method of providing a fluoropolymer coating composition comprising providing a composition comprising a) a fluoroplastic, b) an aromatic material having exactly one hydroxyl group, wherein the aromatic material is free of thiol groups, and wherein the hydroxyl group is bonded to an aromatic carbon, c) a salt former compound capable of forming a salt with the aromatic material and optionally d) a phase transfer catalyst. The fluoroplastic is provided is granular or powder form. The method further comprises heating the composition to a temperature above the melting point of the aromatic material and mixing the composition. In some embodiments, the aromatic material is a liquid at 25° C. at 1 atmosphere of pressure. In other embodiments, the aromatic material may be dissolved in a solvent and the method may further comprise mixing the solvent containing the aromatic material with the fluoroplastic before heating the composition.

In another aspect, the present description provides a method of providing a fluoropolymer-coated surface. The method comprises providing a substrate (optionally selected from an inorganic material), applying a composition to the substrate, and bonding the composition to the substrate to give a bonded composition. Bonding the composition may comprise fusing the composition to the substrate. The composition applied to the substrate comprises a) a fluoroplastic, b) an aromatic material having exactly one hydroxyl group, wherein the aromatic material is free of thiol groups, and wherein the hydroxyl group is bonded to an aromatic carbon, c) a salt former compound capable of forming a salt with the aromatic material and optionally d) a phase transfer catalyst. Each of the aromatic material and the salt former compound is, independently, present at the interface between the substrate and the remainder of the first layer, blended with the fluoroplastic, or both. The composition may optionally be provided as the fluoroplastic having a coating, wherein the coating comprises one or more of b) an aromatic material having exactly one hydroxyl group, wherein the aromatic material is free of thiol groups, and wherein the hydroxyl group is bonded to an aromatic carbon, c) a salt former compound capable of forming a salt with the aromatic material and d) a phase transfer catalyst.

In further embodiments, the method may comprise bonding a second layer to the bonded composition, the second layer comprising a fluoropolymer.

In certain embodiments, the applying of the composition to the substrate comprises a method selected from, for example, electrostatic powder coating, co-extruding the composition and the substrate, and applying the composition to the substrate as a film, sheet, or molded part. In other embodiments, at least one of the aromatic material, optional phase transfer catalyst, and salt former compound may be applied to the substrate to form a primer layer before applying the remainder of the composition as described herein.

Various embodiments of the present invention are useful in chemical storage tanks, exhaust duct coatings, biomedical devices, electronic materials, cookware and bakeware, and architectural coatings, to name a few applications.

Objects and advantages of this invention are further illustrated by the following examples, but the particular materials and amounts thereof recited in these examples, as well as other conditions and details, should not be construed to unduly limit this invention.

EXAMPLES

In the descriptions below, percent means percent by weight unless otherwise described in context. Unless otherwise stated, materials were available from Aldrich Chemicals, Milwaukee, Wis.

| Materials | |
|---|---|
| Material | Source and Description |
| PFA | PFA 6503 A EPC, a copolymer of TFE and PPVE available from Dyneon, LLC, Oakdale, MN. |

-continued

| Materials | |
|---|---|
| Material | Source and Description |
| ETFE | A copolymer of tetrafluoroethylene and ethylene available from Dyneon, LLC, as E-15858H07 |
| TPPCl | 2 |
| Sn | 5 |
| 4-aminophenol | 3 |
| 3-amino-2-naphthol | 2 |
| 9-hydroxyfluorene | 1 |
| 2-naphthol | 1 |
| 4-methoxy-1-naphthol | 1 |
| 4-fluorophenol | 4 |
| 1-amino-8-naphthol-4-sulfonic acid | 4 |
| Naphthol AS (3-Hydroxy-2-naphthanilide) | 1 |
| pentafluorophenol | 1 |
| 4-nitrophenol | 3 |
| 4-cyanophenol | 1 |
| D-gluconic acid, calcium salt | 4 |
| 1-naphtahlene sulfonic acid | 2 |
| 2,3-naphthalene dicarboxylic acid | 4 |
| 1,1,1,3,3,3-Hexafluoro-2-phenyl-2-propanol | 3 |
| Tetramethylammonium chloride (TMAC) | 3 |
| Tetraphenylphosphonium bromide (TPPBr) | 3 |
| Triphenylbenzylphosphonium chloride (JC7) | 3 |

Sources:
1. Aldrich, Milwaukee, WI
2. Alpha Aesar, Heysham, Lancanster
3. Lancaster, Pelham, NH
4. TCI, Portland, OR
5. Atlantic Equipment Engineers, Bergenfield, NJ Methods and Procedures Formulations Except as provided otherwise, aromatic materials and PTC were dissolved into a solution with methanol. Dry and liquid ingredients shown for each example in the tables were weighed, the salt former and the fluoroplastic were pre-blended in a container with a spatula. The liquid solutions were added to the container and stirred in using a spatula and the mixture was added to the milling chamber of a Bel-Art Micro Mill (available from Bel-Art Products Pequannock, N.J.). The mill was turned on for 20-30 seconds to disperse the ingredients. The powder/slurry were poured back into the container, stirred, and added back into the mill and blended for an additional 20-30 seconds. Solids that were not easily put into an alcohol solution were either used as is with median particle size less than 5 microns or ground to less than 5 microns with a mortar and pestle.

Peel Test Sample Preparation

Stainless steel (400 series) or aluminum panels (0.037 in. thickness (0.94 mm)) were sheared into 1×6 inch (2.54×15.2 cm) strips and degreased by immersing the steel strips in a heated alkaline solution of 75 g of OAKITE CLEANER 164 (available from Oakite Products, Berkeley Heights, N.J.) per liter of water maintained at 180° F. (80° C.) for 10 minutes. The strips were then rinsed several times with distilled water, and dried in an air circulating oven at 160° F. (71° C.) for 10 minutes. Unless otherwise noted each strip was grit blasted to roughen the surface using 30 mesh alumina grit and 80 psi (552 kPa) air pressure. Any residual dust was removed with an air gun. The strips were clamped to a larger metal plate and brushed with a thin layer of PFA 6503 B EPC powder (available from Dyneon) over 1.5 to 2 inches (5 cm) of one end of each strip. This provided an area where the coating would not adhere to the metal to create a tab for the peel test.

The strips were next electrostatically powder coated with approximately 40 grams of primer using a Nordson SureCoat (Nordson Corporation Amherst, Ohio) at 70 volts, 150 kPa airflow, over the surface of six strips. The strips were then baked in an air-circulating oven for 10 minutes (unless indicated otherwise) at 400° C. Upon removal of the strips from the oven, the strips were immediately hot flocked with the specific fluoropolymer topcoat at 70 kVolts, 150 kPa airflow and then placed back into the oven for an additional 10 minutes. Additional topcoats (total of 2 or 3) were applied and baked to achieve a coating thickness of 400 to 1000 μm. After the samples were cooled, the edges of each strip were scraped with a sharp blade to remove any coating that may have accumulated at the edges of the specimen. The samples were immersed in boiling water for 24 hours. After removal from the water, the samples were cooled to room temperature prior to peel testing.

Peel Testing

The peel strength was measured by testing the samples using an INSTRON Model 5564 Tester (available from Instron Corp., Canton, Mass.) equipped with a floating roller peel test fixture at a crosshead speed of 6 in/min (15 cm/min) and peeling to 3.75 inches (9.5 cm) extension per ASTM D3167-97. The peel strength was calculated over 0.5 to 3.5 inches (1.3 to 8.9 cm) extension using an integrated average and reported in lb/inch width (N/mm) as an average of three samples. Unless otherwise noted, all peel testing was performed on samples after they were exposed to 24 hours of boiling water.

Examples 1-27 and Comparative Examples C1-C5

The fluoropolymer blends were prepared with the amounts shown in Tables 1-4 by blending an aromatic material, a base, and a specific fluoropolymer and optionally a 50% solution of a phase transfer catalyst in methanol (weights in tables are for solids). Unless otherwise noted the procedure used is that described under "Formulations" and all oven temperature conditions were 750° F. (400° C.) for 10 minutes. The resulting fluoropolymer blend was then powder coated and peel tested using the procedures described under "Peel Test Sample Preparation" and "Peel Testing" (unless otherwise noted). The formulations and peel test results are shown in the Tables 1-4. Where the peel strength is indicated as "Less than 2 lb/in (<0.3 N/mm)", this indicates that the Peel Testing method was not able to quantify the strength of the bonding after boiling water exposure. NT indicates that a peel strength was not tested. Where the peel strength is indicated as "0", this indicates that no bond was observed after boiling water exposure. The comparative examples C1-C5 were prepared in a similar manner to the examples as described in Table 4.

Table 1 shows a number of embodiments of the described fluoropolymer blends and multi-layer articles using various aromatic compounds with or without PTC. Table 2 shows a number of embodiments of the described fluoropolymer blends and multi-layer articles using two different fluoropolymers. Table 3 shows a number of embodiments of the described fluoropolymer blends and multi-layer articles using various bases. Table 4 shows a number of embodiments using various PTC's. Table 5 shows a group of comparative examples.

TABLE 1

Compositions with Various Aromatic Materials

| Ex. | Fluoropolymer (g) | Aromatic Material (g) | PTC (g) | Additive (g) | Base (g) | Peel Strength lb/in (N/mm) SS | Peel Strength lb/in (N/mm) Al |
|---|---|---|---|---|---|---|---|
| 1 | PFA (38.0) | 4-fluorophenol (1.0) | None | None | Ca(OH)$_2$ (1.0) | <2.00 (<0.350) | 2.10 (0.368) |
| 2 | PFA (37.5) | 4-fluorophenol (1.0) | TPPCl (0.5) | None | Ca(OH)$_2$ (1.0) | 41.7[e] (7.30) | 50.6[e] (8.86) |
| 3 | PFA (38.0) | 2-naphthol (1.0) | None | None | Ca(OH)$_2$ (1.0) | 3.70 (0.648) | 2.60 (0.455) |
| 4 | PFA (37.5) | 2-naphthol[b] (1.0) | TPPCl (0.5) | None | Ca(OH)$_2$ (1.0) | 32.6[e] (5.71) | 31.4[e] (5.50) |
| 5 | PFA (37.5) | 2-naphthol[c] (1.0) | TPPCl (0.5) | None | Ca(OH)$_2$ (1.0) | 10.1 (1.77) | 1.91 (0.334) |
| 6 | PFA (37.5) | 2-naphthol[d] (1.0) | TPPCl (0.5) | None | Ca(OH)$_2$ (0.26) | >27.2 (8.41) | 17.8 (3.12) |
| 7 | PFA (37.5) | 2-naphthol[d] (1.0) | TPPCl (0.26) | None | Ca(OH)$_2$ (2.6) | 14.8 (0.545) | 10.5 (1.84) |
| 8 | PFA (36.6) | 4-aminophenol (1.0) | TPPCl (1.0) | Sn (0.4) | Ca(OH)$_2$ (1.0) | 14.3 (2.50) | 2.70 (0.473) |
| 9 | PFA (36.6) | 3-amino-2-naphthol (1.0) | TPPCl (1.0) | Sn (0.4) | Ca(OH)$_2$ (1.0) | 12.7 (5.56) | a |
| 10 | PFA (37.5) | 9-hydroxyfluorene (1.0) | TPPCl (0.5) | None | Ca(OH)$_2$ (1.0) | 13.6 (2.38) | <2.00 (<0.350) |
| 11 | PFA (37.5) | 4-methoxy-1-naphthol (1.0) | TPPCl (0.5) | None | Ca(OH)$_2$ (1.0) | 33.8[e] (5.92) | 8.00 (1.40) |
| 12 | PFA (37.5) | 1-amino-8-naphthol-4-sulfonic acid (1.0) | TPPCl (0.50) | None | Ca(OH)$_2$ (1.0) | 20.9 (3.66) | 27.0 (4.73) |
| 13 | PFA (37.5) | Naphthol AS (1.0) | TPPCl (0.5) | None | Ca(OH)$_2$ (1.0) | 27.8[e] (4.87) | 7.07 (1.24) |
| 14 | PFA (37.5) | 4-nitrophenol (1.0) | TPPCl (0.5) | None | Ca(OH)$_2$ (1.0) | 10.9 (1.91) | 10.5 (1.84) |
| 15 | PFA (37.5) | 4-cyanophenol (1.0) | TPPCl (0.5) | None | Ca(OH)$_2$ (1.0) | <2.00 (<0.350) | 2.10 (0.368) |
| 16 | PFA (37.5) | pentafluorophenol (1.0) | TPPCl (0.5) | None | Ca(OH)$_2$ (1.0) | 5.40 (0.945) | 3.40 (0.595) |

[a] Not tested
[b] PTC and aromatic premixed in hot methanol
[c] Solution blended base/PTC/aromatic. Formed thick paste plus crystals at room temperature
[d] Pre-blended base/PTC/aromatic
[e] Tabs broke

TABLE 2

Compositions with Various Fluoropolymers

| Ex. | Fluoropolymer (g) | Aromatic Material (g) | PTC (g) | Base (g) | Peel Strength lb/in (N/mm) SS | Peel Strength lb/in (N/mm) Al |
|---|---|---|---|---|---|---|
| 17 | PFA (37.5) | 2-naphthol (1.0)[a] | TPPCl (0.5) | Ca(OH)$_2$ 1.0) | 10.1 (1.77) | 1.91 (0.334) |
| 18 | ETFE (37.5) | 2-naphthol (1.0) | TPPCl (0.5) | Ca(OH)$_2$ (1.0) | 14.0 (2.45) | 16.3 (28.5) |

[a] Solution blended base/PTC/aromatic. Formed thick paste plus crystals at room temperature

TABLE 3

Compositions with Various Bases

| Ex. | Fluoropolymer (g) | Aromatic Material (g) | PTC (g) | Base (g) | Peel Strength lb/in (N/mm) SS | Peel Strength lb/in (N/mm) Al |
|---|---|---|---|---|---|---|
| 19 | PFA (37.5) | 2-naphthol (1.0) | TPPCl (0.5) | LiOH (1.0) | 12.7 (2.22) | 7.60 (1.33) |
| 20 | PFA (37.5) | 2-naphthol (1.0) | TPPCl (0.5) | Ca(OH)$_2$ (1.0) | 33.9[a] (5.93) | 16.3 (2.85) |

TABLE 3-continued

Compositions with Various Bases

| Ex. | Fluoropolymer (g) | Aromatic Material (g) | PTC (g) | Base (g) | Peel Strength lb/in (N/mm) SS | Peel Strength lb/in (N/mm) Al |
|---|---|---|---|---|---|---|
| 21 | PFA (37.5) | 2-naphthol (1.0) | TPPCl (0.5) | KOH (1.0) | 16.3 (2.85) | 2.20 (0.385) |
| 22 | PFA (37.5) | 2-naphthol (1.0) | TPPCl (0.5) | Ba(OH)$_2$ (1.0) | 18.9 (3.31) | 3.20 (0.560) |

[a]Tabs broke

TABLE 4

Compositions with Various PTC's

| Ex. | Fluoropolymer (g) | Aromatic Material (g) | PTC (g) | Base (g) | Peel Strength lb/in (N/mm) SS | Peel Strength lb/in (N/mm) Al |
|---|---|---|---|---|---|---|
| 23 | PFA (36.0) | 2-naphthol (2.0) | TMAC (1.0) | Ca(OH)$_2$ (1.0) | 26.1[e] (4.57) | 10.7 (1.87) |
| 24 | PFA (37.5) | 2-naphthol (1.0) | a | Ca(OH)$_2$ (1.0) | 28 (4.6) | <2 (<0.350) |
| 25 | PFA (37.5) | 2-naphthol (1.0) | b | Ca(OH)$_2$ (1.0) | 10.6 (1.9) | 25.1[e] (4.3) |
| 26 | PFA (37.5) | 2-naphthol (1.0) | c | Ca(OH)$_2$ (1.0) | 13.8 (2.5) | 8.7 (7.5) |
| 27 | PFA (37.5) | 2-naphthol (1.0) | d | Ca(OH)$_2$ (1.0) | 18.6 (3.0) | 10.2 (1.95) |

[a]Tetraethylphosphonium bromide (1.0 g)
[b]Tetrakis(2-hyroxyethyl)ammonium bromide (1.0 g)
[c]Tetrabutylammonium hexasulfide (1.0 g)
[d]Tetrapropylammonium iodide (1.0 g)
[e]Tabs broke

TABLE 5

Comparative Compositions

| Ex. | Fluoropolymer (g) | Comparative additive (g) | PTC (g) | Base (g) | Peel Strength lb/in (N/mm) SS | Peel Strength lb/in (N/mm) Al |
|---|---|---|---|---|---|---|
| C1 | PFA (37.5) | D-Gluconic acid, calcium salt (1.0) | TPPCl (0.5) | Salt preformed | 0 (0) | 0 (0) |
| C2 | PFA (37.5) | Naphthalene sulfonic acid (1.0) | TPPCl (0.5) | Ca(OH)$_2$ (1.0) | 0 (0) | 0 (0) |
| C3 | PFA (37.5) | 2,3 Naphthalenesulfonic acid (1.0) | TPPCl (0.5) | Ca(OH)$_2$ (1.0) | 0 (0) | 0 (0) |
| C4 | PFA (37.5) | 1,1,1,3,3,3-Hexafluoro-2-phenyl-2-propanol (1.0) | TPPCl (0.5) | Ca(OH)$_2$ (1.0) | 0 (0) | 0 (0) |
| C5 | PFA (38.5) | None | TPPCl (0.5) | Ca(OH)$_2$ (1.0) | <2.00 (<0.350)[a] | <2.00 (<0.350)[a] |

[a]Not exposed to 24 hour boiling water.

We claim:

1. A powder coating fluoropolymer composition comprising:

a) a fluoroplastic;

b) an aromatic material having a structure of the formula:

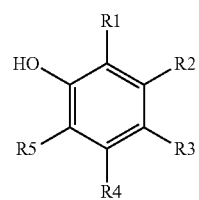

wherein R1, R2, R3, R4, and R5 are each independently selected from a hydrogen atom, an alkyl group having 1 to 10 carbon atoms, an alkylene group having 1 to 10 carbon atoms wherein the alkylene group forms an alkylene fused ring with a group in the ortho position, an alkenylene group having 1 to 10 carbon atoms wherein the alkenylene group forms an alkenylene fused ring with a group in the ortho position, an aryl group having 5 to 20 carbon atoms, an alkaryl group having 6 to 25 carbon atoms, a nitro group, a cyano group, an acyl group, an Ar—S(O)— group wherein Ar is an aromatic group, an Ar—S(O)$_2$— group wherein Ar is an aromatic group, an Ar$_2$P(O)— group wherein Ar is an aromatic group, and a halogen atom, further wherein the aromatic material is free of thiol groups;

c) a salt former compound capable of forming a salt with the aromatic material; and d) optionally a phase transfer catalyst.

2. The composition of claim 1, wherein the alkyl group is selected from a partially fluorinated alkyl group and a perfluorinated alkyl group.

3. The composition of claim 1 wherein the aromatic material is a monohydroxy naphthalene.

4. The composition of claim 1 wherein the substituents R1, R2, R3, R4, and R5 have a net electron-donating effect.

5. The composition of claim 1 wherein the salt former compound has a pK$_b$ of 8 or less.

6. The composition of claim 1 further comprising a filler selected from the group consisting of mica, boron nitride, clays, graphite, calcium carbonate, carbon, silicates, glass and fibers.

7. A composition comprising:
a reaction product of a) a fluoroplastic; b) an aromatic material having exactly one hydroxyl group, wherein the aromatic material is free of thiol groups, wherein the aromatic material is selected from the group consisting of benzyl alcohol, fluorene alcohol, and derivatives thereof; c) a salt former compound capable of forming a salt with the aromatic material; and d) a phase transfer catalyst.

8. A multi-layer article comprising:
a) a substrate; and
b) a first layer comprising a reaction product of A) a fluoroplastic; B) an aromatic material having exactly one hydroxyl group, wherein the aromatic material is free of thiol groups; and C) a salt former compound capable of forming a salt with the aromatic material;

wherein each of the aromatic material and the salt former compound is (i) independently present at the interface between the substrate and the remainder of the first layer, (ii) independently blended with the fluoroplastic, or (iii) both; and wherein the first layer is bonded to the substrate further comprising a second layer adjacent to the first layer, the second layer comprising a fluoropolymer, and optionally a third layer adjacent to the second layer, the third layer comprising a fluoropolymer.

9. The article of claim 8 wherein the substrate is selected from iron, steel, stainless steel, aluminum, copper, nickel, and alloys thereof, ceramic, and thermally stable organic substrates.

* * * * *